United States Patent
Bos et al.

(10) Patent No.: US 10,361,855 B2
(45) Date of Patent: Jul. 23, 2019

(54) COMPUTING A SECURE ELLIPTIC CURVE SCALAR MULTIPLICATION USING AN UNSECURED AND SECURE ENVIRONMENT

(71) Applicant: NXP B.V., Eindhoven (NL)

(72) Inventors: Joppe Willem Bos, Wijgmaal (BE); Artur Tadeusz Burchard, Eindhoven (NL); Jan Hoogerbrugge, Eindhoven (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 440 days.

(21) Appl. No.: 15/166,925

(22) Filed: May 27, 2016

(65) Prior Publication Data

US 2017/0346633 A1 Nov. 30, 2017

(51) Int. Cl.
*H04L 9/30* (2006.01)
*G06F 7/72* (2006.01)
(Continued)

(52) U.S. Cl.
CPC ............ *H04L 9/3066* (2013.01); *G06F 7/725* (2013.01); *H04L 9/002* (2013.01);
(Continued)

(58) Field of Classification Search
CPC ...... G06F 7/725; G06F 12/1433; G06F 7/722; H04L 9/3218; H04L 9/3066
(Continued)

(56) References Cited

U.S. PATENT DOCUMENTS 7,062,044 B1 6/2006 Solinas
8,391,477 B2 * 3/2013 Izu ........................ G06F 7/725
380/30

(Continued)

OTHER PUBLICATIONS

Guo et al., "Programmable arid Parallel ECC Coprocessor Architecture: Tradeoffs between Area, Speed and Security," International Association for Cryptologic Research, 2009, 15 pages.

(Continued)

*Primary Examiner* — Bryan F Wright

(57) ABSTRACT

A system includes a secure processor and an unsecure processor. The secure processor is configured to: split a secure scalar K into $m_2$ random values $k_i$, where i is an integer index; randomly select $m_1-m_2$ values $k_i$ for the indices $m_2 < i \leq m_1$; select $m_1$ mask values $\delta_i$; compute $m_1$ residues $c_i$ based upon random residues $a_i$, $\delta_{\pi(i)}^{-1}$, and $k_{\pi(i)}$, wherein $\pi(i)$ is a random permutation; compute $m_1$ elliptic curve points $G_i$ based upon random residues $a_i$ and an elliptic point to be multiplied; receive $m_1$ elliptic curve points; and compute the elliptic curve scalar multiplication by combining a portion of the received elliptic curve points and removing the mask values $\delta_i$ from the portion of the received elliptic curve points. The unsecure processor is configured to: receive $m_1$ residues $c_i$ and elliptic curve points $G_i$; compute $m_1$ elliptic curve points $P_i$ based upon the $m_1$ residues $c_i$ and elliptic curve points $G_i$; and send the $m_1$ elliptic curve points $P_i$ to the secure processor.

24 Claims, 1 Drawing Sheet

(51) Int. Cl.
*H04L 9/00* (2006.01)
*G06F 12/14* (2006.01)

(52) U.S. Cl.
CPC .. *G06F 12/1433* (2013.01); *G06F 2207/7242* (2013.01); *G06F 2207/7252* (2013.01); *H04L 2209/16* (2013.01); *H04L 2209/46* (2013.01)

(58) Field of Classification Search
USPC .......................................................... 380/30
See application file for complete search history.

(56) References Cited

U.S. PATENT DOCUMENTS

| | | | | |
|---|---|---|---|---|
| 8,411,855 B1* | 4/2013 | Robinson | ................ | G06F 7/725 380/28 |
| 2008/0219450 A1 | 9/2008 | Ebeid | | |
| 2008/0301438 A1* | 12/2008 | Parkinson | ............. | H04L 9/3218 713/156 |
| 2009/0003595 A1* | 1/2009 | Ozturk | ...................... | G06F 7/72 380/30 |
| 2009/0214023 A1* | 8/2009 | Al-Somani | ............. | G06F 7/725 380/28 |
| 2010/0011047 A1* | 1/2010 | Jackson | .................. | G06F 7/722 708/491 |
| 2010/0037069 A1* | 2/2010 | Deierling | ............ | G06F 12/1433 713/193 |
| 2012/0213360 A1* | 8/2012 | Le Quere | .............. | G06F 9/3877 380/28 |
| 2017/0187530 A1* | 6/2017 | Ghosh | ................... | H04L 9/3066 |

OTHER PUBLICATIONS

Neal Koblitz, Elliptic curve cryptosystems, Mathematics of Computation 48 (1987), No. 177 203-209.

Paul C. Kocher, Joshua Jaffe, and Benjamin Jun, Differential power analysis, Advances in Cryptology—CRYPTO '99 (Michael J. Wiener, ed.), Lecture Notes in Computer Science, vol. 1666 pp. 537-554.

U.S. Department of Commerce/National Institute of Standards and Technology, Digital Signature, FIPS.186.4 2013.

Victor S. Miller, Use of elliptic curves in cryptography, Crypto 1985 (Hugh C. Williams, ed.), Lecture Notes in Computer Science, vol. 218, Springer, Heidelberg, 1986, pp. 417-426.

* cited by examiner

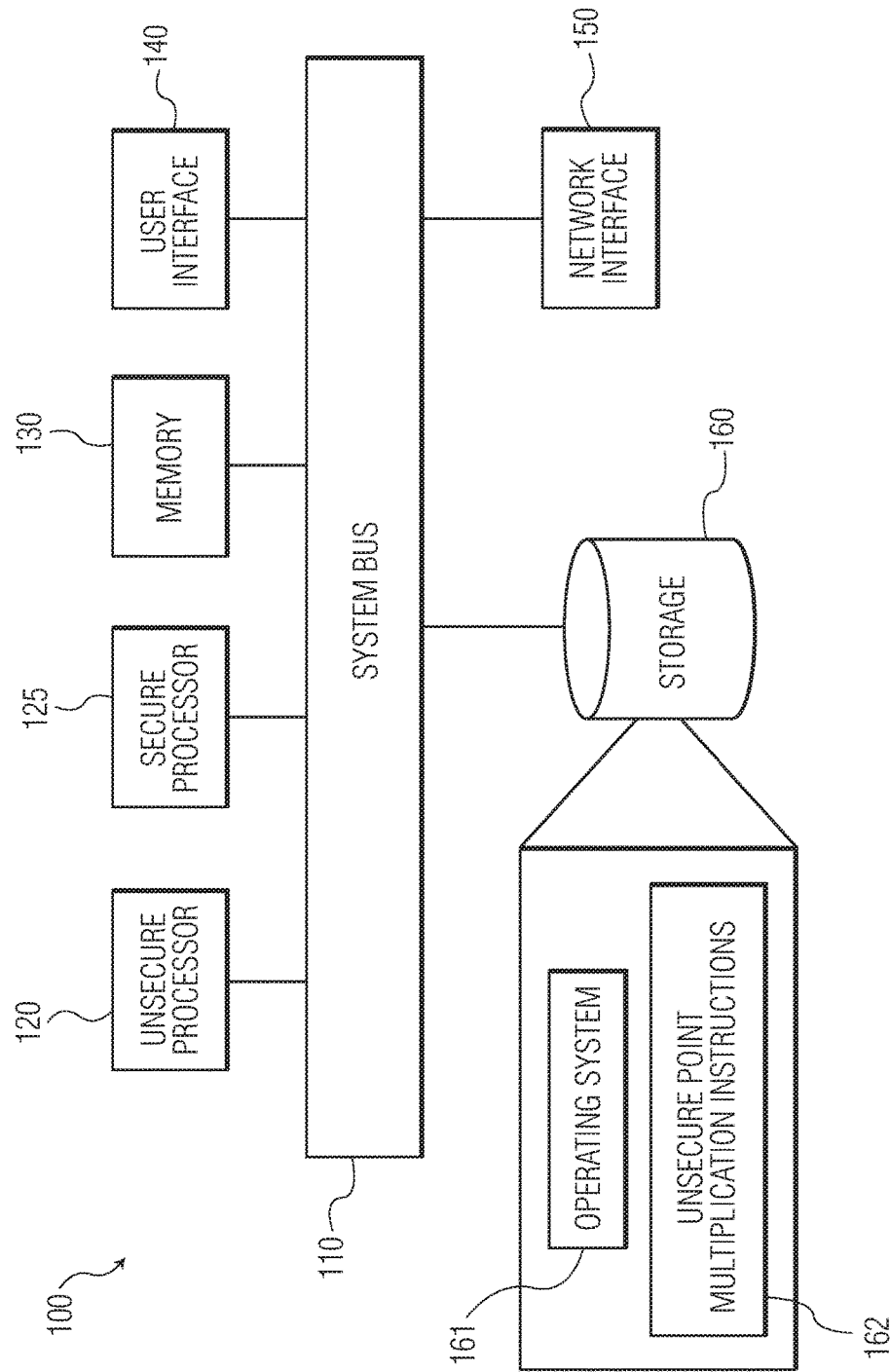

COMPUTING A SECURE ELLIPTIC CURVE SCALAR MULTIPLICATION USING AN UNSECURED AND SECURE ENVIRONMENT

TECHNICAL FIELD

Various exemplary embodiments disclosed herein relate generally to securely calculating an elliptic curve scalar multiplication using an unsecured and secure environment.

BACKGROUND

Today software applications are widely used to provide various services to users. These software applications may be hosted on a variety of different devices, such as for example, mobile phones, personal computers, laptop computers, tablets, set top boxes, etc. Software applications are found in many systems in use by consumers or in industrial systems. Software applications are also found in smart cards and credit cards. Further, software applications may be implemented across networks such as the internet, where the software application runs on servers, and is accessed using various user devices. Many of these software applications require the use of security protocols to protect content, information, transactions, and privacy. Many software applications are run in environments where an attacker has complete control of the operation of the software application, and an attacker may attempt to reverse engineer the code of the software application in order to gain access to secure information or to even understand the operation of the software in order to reproduce or modify the functionality of the software application. An attacker may use various reverse engineering tools, such as for example, code analyzers and debuggers, to obtain information related to the software application.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a system for securely computing an elliptic curve scalar multiplication in an unsecured environment, including: a secure processor including secure memory, the secure processor configured to: split a secure scalar K into $m_2$ random values $k_i$, where i is an integer index; randomly select $m_1$- $m_2$ values $k_i$ for the indices $m_2 < i \leq m_1$; select $m_1$ mask values $\delta_i$; compute $m_1$ residues $c_i$ based upon random residues $a_i$, $\delta_{\pi(i)}^{-1}$, and $k_{\pi(i)}$, wherein $\pi(i)$ is a random permutation; compute $m_1$ elliptic curve points $G_i$ based upon random residues $a_i$ and an elliptic point to be multiplied; receive $m_1$ elliptic curve points; and compute the elliptic curve scalar multiplication by combining a portion of the received elliptic curve points and removing the mask values $\delta_i$ from the portion of the received elliptic curve points; a memory device; and a processor in communication with the memory device, the processor being configured to: receive $m_1$ residues $c_i$ and elliptic curve points $G_i$; compute $m_1$ elliptic curve points $P_i$ based upon the $m_1$ residues $c_i$ and elliptic curve points $G_i$; send the $m_1$ elliptic curve points $P_i$ to the secure processor.

Further, various exemplary embodiments relate to a method for securely computing an elliptic curve scalar multiplication using a secure processor and an unsecure processor, including: by the secure processor: splitting a secure scalar K into $m_2$ random values $k_i$, where i is an integer index; randomly selecting $m_1$- $m_2$ values $k_i$ for the indices $m_2 < i \leq m_1$; selecting $m_1$ mask values $\delta_i$; computing $m_1$ residues $c_i$ based upon random residues $a_i$, $\delta_{\pi(i)}^{-1}$, and $k_{\pi(i)}$, wherein $\pi(i)$ is a random permutation; computing $m_1$ elliptic curve points $G_i$ based upon random residues $a_i$ and an elliptic point to be multiplied; receiving $m_1$ elliptic curve points; and computing the elliptic curve scalar multiplication by combining a portion of the received elliptic curve points and removing the mask values $\delta_i$ from the portion of the received elliptic curve points; and by the unsecure processor: receiving $m_1$ residues $c_i$ and elliptic curve points $G_i$; computing $m_1$ elliptic curve points $P_i$ based upon the $m_1$ residues $c_i$ and elliptic curve points $G_i$; sending the $m_1$ elliptic curve points $P_i$ to the secure processor.

Further, various exemplary embodiments relate to a non-transitory machine-readable storage medium encoded with instructions for securely computing an elliptic curve scalar multiplication using a secure processor and an unsecure processor, including: instructions for execution by the secure processor including: instructions for splitting a secure scalar K into $m_2$ random values $k_i$, where i is an integer index; instructions for randomly selecting $m_1$- $m_2$ values $k_i$ for the indices $m_2 < i \leq m_1$; instructions for selecting $m_1$ mask values $\delta_i$; instructions for computing $m_1$ residues $c_i$ based upon random residues $a_i$, $\delta_{\pi(i)}^{-1}$, and $k_{\pi(i)}$, wherein $\pi(i)$ is a random permutation; instructions for computing $m_1$ elliptic curve points $G_i$ based upon random residues $a_i$ and an elliptic point to be multiplied; instructions for receiving $m_1$ elliptic curve points; and instructions for computing the elliptic curve scalar multiplication by combining a portion of the received elliptic curve points and removing the mask values $\delta_i$ from the portion of the received elliptic curve points; and instructions for execution by the unsecure processor including: instructions for receiving $m_1$ residues $c_i$ and elliptic curve points $G_i$; instructions for computing $m_1$ elliptic curve points $P_i$ based upon the $m_1$ residues $c_i$ and elliptic curve points $G_i$; instructions for sending the $m_1$ elliptic curve points $P_i$ to the secure processor.

Various embodiments are described wherein the secure processor further: randomly selects $m_1$ residues $a_i$; and stores the $m_1$ residues $a_i$ in a secure memory.

Various embodiments are described wherein the $m_1$ mask values $\delta_i$ are selected from set of pre-computed random values stored in a secure memory.

Various embodiments are described wherein computing $m_1$ elliptic curve points $G_i$ based upon random residues $a_i$ and an elliptic point to be multiplied is computed as: $G_i = (a_i^{-1} \bmod n) \cdot G$, for $1 \leq i \leq m_1$, where G is elliptic point of the elliptic curve to be multiplied and n is the multiplicative order of the elliptic point G.

Various embodiments are described wherein splitting a secure scalar K into $m_2$ random values $k_i$ includes selecting $m_2 - 1$ random values $k_i$, for $1 \leq i < m_2 - 1$, and computing $k_{m_2} = k - (\sum_{i=1}^{m_2-1} k_i) \bmod n$, where n is the multiplicative order of the elliptic point.

Various embodiments are described wherein computing $m_1$ residues $c_I$ is computed as: $c_i = a_i \cdot \delta_{\pi(i)}^{-1} \cdot k_{\pi(i)} \bmod n$, where n is the multiplicative order of the elliptic point.

Various embodiments are described wherein computing $m_1$ elliptic curve points $P_i$ is computed as: $P_i = c_i \cdot G_i$.

Various embodiments are described wherein computing the elliptic curve scalar multiplication by combining a portion of the received elliptic curve points and removing the mask values $\delta_i$ from the portion of the received elliptic curve points is computed as: $k \cdot G = \sum_{i=1}^{m_2} \delta_i \cdot P_{\pi^{-1}(i)}$, where G is elliptic point of the elliptic curve to be multiplied.

BRIEF DESCRIPTION OF THE DRAWINGS

In order to better understand various exemplary embodiments, reference is made to the accompanying drawings, wherein:

FIG. 1 illustrates an hardware diagram for implementing an elliptic curve point multiplication.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Devices that provide secure functions may do so using secure processor devices. Such devices may also include unsecure processor devices. The computational capabilities of the unsecure processor device may be much greater as compared to the secure processing device because of the cost and complexity of producing a secure processor. The cryptographic routines running on the secure processor device are therefore limited by the computational power of this secure processor device and may have longer execution times.

Embodiments are described herein where the most computational intensive steps of the cryptographic algorithms may be offloaded to the more powerful unsecure processor device in such a way that only the secure processor device can later reconstruct the desired result correctly.

An approach to compute an elliptic curve scalar multiplication will now be described using both a secure processor and an unsecure processor. Then it will be shown how this can be used, for instance, to instantiate an elliptic curve digital signature algorithm. This description assumes secure processor device which may be considered secure (e.g., a secure element) and an unsecure processor device to which an attacker has complete access. In many systems, the unsecure processor device may have computational capabilities and performance which is significantly better than the secure processor device.

In the embodiments described herein, the most time consuming steps may be performed on the unsecure processor device. However, in order to remain secure, this unsecure processor device will work on obfuscated or masked data such that an attacker observing the cryptographic operation does not learn sufficient information to compute the secret scalar involved in this computation.

Now a brief description elliptic curve cryptography (ECC) will be provided. Let $F_p$ denote a finite field of prime cardinality $p > 3$. Any $a, b \in F_p$ with $4a^3 + 27b^2 \neq 0$ define an elliptic curve $E_{a,b}$ over $F_p$. The group of points $E_{a,b}(F_p)$ of $E_{a,b}$ over $F_p$ is defined as the zero point $\infty$ along with the set of pairs $(x, y) \in F_p \times F_p$ that satisfy the short Weierstrass equation $$y^2 = x^3 + ax + b \tag{1}$$

with the following additively written group law. For $P \in E_{a,b}(F_p)$ define $P + \infty = \infty + P = P$. For non-zero $P = (x_1, y_1)$ and $Q = (x_2, y_2) \in E_{a,b}(F_p)$ define $P + Q = \infty$ if $x_1 = x_2$ and $y_1 = -y_2$. Otherwise $P + Q = (x, y)$ with $x = \lambda^2 - x_1 - x_2$ and $y = \lambda(x_1 - x) - y_1$, where $$\lambda = \begin{cases} \dfrac{3x_1^2 + a}{2y_1} & \text{if } x_1 = x_2 \text{ (and thus } P = Q) \\ \dfrac{y_1 - y_2}{x_1 - x_2} & \text{otherwise} \end{cases}.$$

Thus, using these affine Weierstrass coordinates to represent group elements, doubling (i.e., $P = Q$) is different from regular addition (i.e., $P \neq Q$).

Based on this algebraic structure of elliptic curves over finite fields, public-key cryptographic primitives may be built. One of the key features of ECC is the significantly smaller key-sizes as compared to, for instance, asymmetric cryptographic systems based on RSA. The most time consuming operation in many ECC protocols is the elliptic curve scalar multiplication $kP$ for an integer $k$ and a point $P \in E(F_p)$. This scalar multiplication may be defined as adding the point $P$ $(k-1)$ times to itself. As an example see Algorithm 1 below for the elliptic curve variant of the digital signature algorithm as standardized by the United States National Institute of Standards and Technology where step 5 includes a scalar multiplication of an elliptic point P.

---

Algorithm 1 ECDSA signature generation. Given a (cryptographic) hash function $\mathcal{H}$, a message $m \in Z$, a public point $P \in E(F_p)$ of order $n \in Z$, and a private key $d \in Z/nZ$ compute the signature $(r, s) \in Z/nZ^* \times Z/nZ^*$.

1: function ECDSA_SIGN_GEN((m,d,(P,n,$\mathcal{H}$)))
2:   repeat
3:     repeat
4:       Select $k \in_K [1, n-1]$
5:       Compute $kP = (x, y)$
6:       Compute $r = x \mod n$
7:     until $r \neq 0$
8:     Compute $e = \mathcal{H}(m)$
9:     Compute $x = k^{-1}(e + dr) \mod n$
10:   until $s \neq 0$
11:   return $(r, s)$
12: end function

---

Since the late 1990s, it is publicly known that the statistical analysis of a power trace obtained when executing a cryptographic primitive might correlate to, and hence reveal information about, the secret key material used. Such a differential power analysis, and the many more follow-up works, are powerful tools to break the security of implementations of cryptographic algorithms. There are many techniques to counter such attacks. These can either work on the algorithmic level or on the hardware level by offering additional security properties. Environments where such side-channel attacks are not able to extract the secret key material may be denoted as secure environments. Such specialized hardware platforms come at a cost in that they execute at a much lower clock frequency compared to unsecure hardware platforms.

In the following description, it is assumed an elliptic curve defined over a finite field $E(F_p)$ together with a generator $G \in E(F_p)$ of prime order n is used.

In order for the computation to be carried out successfully, the secure processor device will have access to some pre-computed data that may be calculated as part of an initialization phase. This data may be refreshed at a regular interval, but for the description herein, a fixed set of parameters is assumed.

This initialization phase may take as input integers $m_1 > 2$ and $t \geq m_1$ which control the number of pre-computed values and defines the amount of data which is later transmitted between the secure and unsecure processor device. Given integers $m_1$ and t the following values may be computed.

Select $m_1$ random residues $a_i \in (Z/nZ)^*$ such that $0 \leq a_i < n$ for $1 \leq i \leq m_1$ and store the $m_1$ random residues $a_i$ in a secure environment associated with the secure processor device.

Select t random residues $\lambda_i \in (Z/nZ)^*$ such that $0 \leq \lambda_i < n$ for $1 \leq i \leq t$. Define the set $$\Lambda = \{\lambda_1, \lambda_2, \ldots, \lambda_t\}$$

and store this set in the secure environment.

Compute the $m_1$ elliptic curve points $$G_i = (a_i^{-1} \bmod n) \cdot G,$$

for $1 \leq i \leq m_1$, where all $G_i, G \in E(F_p)$ and G is the generator specified in the elliptic curve standard. These elliptic curve points $G_i$ are sent to the unsecure processor.

When the $a_i$, $\lambda_j$, and $G_i$, for $1 \leq i \leq n$ and $1 \leq j \leq t$, have been pre-computed and stored on the secure processor device, the computation of the elliptic curve scalar multiplication may begin. The secure processor device performs the following steps on the input data from the initialization phase and a scalar k (which needs be kept secret).

Select a random integer $k \in (Z/nZ)^*$.

Select a random integer $m_2 \in [1, 2, \ldots, m_1]$.

Split k in $m_2$ random parts. For example, this may be achieved by selecting $m_2 - 1$ random values $k_i \in (Z/nZ)^*$, for $1 \leq i < m_2 - 1$, and computing the last value as $k_{m_2} = k - (\Sigma_{i=1}^{m_2 - 1} k_i) \bmod n$. These split values may be recombined to determine the value k. Further, calculations on the split values may also later be combined so the result is a calculation on the value k.

Select $m_1 - m_2$ random values $k_i \in (Z/nZ)^*$ for the indices $m_2 < i \leq m_1$. The additional random values are used to further mask the actual values associated with k as well be seen below.

Select a random permutation $\pi: \{1, 2, \ldots, m_1\} \mapsto \{1, 2, \ldots, m_1\}$.

Select $m_1$ (not necessarily distinct) values $\delta_i \in \Lambda$ (the pre-computed set of random elements from $(Z/nZ)^*$). These values are used to create an $m_1$-tuple (e.g., a finite ordered list) $(\delta_1, \delta_2, \ldots, \delta_{m_1})$.

Compute the $m_1$ residues $c_i \in Z/nZ$ as $c_i = a_i \cdot \delta_{\pi(i)}^{-1} \cdot k_{\pi(i)} \bmod n$, for $1 \leq i \leq m_1$. The use of the random permutation in selecting the order in which $\delta_i$ and $k_i$ values are used further obscures the various calculations from an attacker and it will vary from each iteration of the point multiplication.

Send these $m_1$ residues $c_i$ and elliptic curve points $G_i$ to the unsecure processor device.

After receiving the $m_1$ residues $c_i$, for $1 \leq i \leq m_1$ the unsecure processor device computes $m_1$ elliptic curve scalar multiplications with the pre-computed points $G_i \in E(F_p)$ $$P_i = c_i G_i, \text{ for } 1 \leq i \leq m_1.$$

As the values $c_i$ and $G_i$ are large values, this calculation will be more efficiently and quickly carried out by the unsecure processor device versus the secure processor device. The unsecure processor device transfers the resulting points $P_i \in E(F_p)$ back to the secure processor device.

The secure processor device receives these $m_1$ points which correspond to $$P_i = c_i \cdot G_i = (a_i \cdot \delta_{\pi(i)}^{-1} \cdot k_{\pi(i)}) \cdot (a_i^{-1} \cdot G) = \delta_{\pi(i)}^{-1} \cdot k_{\pi(i)} \cdot G.$$

Next, the secure processor device combines the appropriate points and removes the final obfuscation (masks) to compute the required elliptic curve scalar multiplication as $$\Sigma_{i=1}^{m_2} \delta_i \cdot P_{\pi^{-1}(i)} = \Sigma_{i=1}^{m_2} \delta_i (\delta_i^{-1} \cdot k_i \cdot G) = \Sigma_{i=1}^{m_2} k_i \cdot G = k \cdot G.$$

Because an adversary may observe the $m_1$ residues being transmitted between the secure and unsecure processor device, the difficulty of recovering the random value k relies on the difficulty of solving an instance of the subset sum problem.

The embodiment described above illustrates a technique of how to divide the workload of an elliptic curve scalar multiplication between two computational devices. One of these computational devices may be considered secure (e.g., a secure element) while the other device may be unsecured, but is assumed to have significantly better computational capabilities. The distribution of this work is performed in such a way that the computational intensive part of the computation is performed on the unsecure (but faster) device while the security is still guaranteed. This hybrid approach may be used to, for instance, boost the performance of elliptic curve based cryptographic schemes.

FIG. 1 illustrates an hardware diagram 100 for implementing an elliptic curve point multiplication. As shown, the device 100 includes an unsecure processor device 120, secure processor device 125, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The unsecure processor device 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The secure processor device 120 may be any hardware device capable of executing instructions stored in secure memory or storage that is part of the secure processor device or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the unsecure processor device 120 or data upon with the unsecure processor device 120 operate. For example, the storage 160 may store a base operating system 161 for controlling various basic operations of the hardware 100. Further, the storage 160 may include unsecured point multiplication instructions 162 that carry out the steps of the point multiplication by unsecure processor device 120 described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the unsecure processor device 120 may include multiple microprocessors that are configured to independently execute the methods described herein or are configured to perform steps or subroutines of the methods described herein such that the multiple processors cooperate to achieve the functionality described herein. Likewise, the secure processor device 125 may include multiple microprocessors that are configured to independently execute the methods described herein or are configured to perform steps or subroutines of the methods described herein such that the multiple processors cooperate to achieve the functionality described herein.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code of a white-box implementation according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A system for securely performing elliptic curve scalar multiplication, the system comprising an unsecure processor, a memory device and an secure processor separate from the unsecure processor, the secure processor including secure memory, the secure processor configured to:
split a secure scalar K into $m_2$ random values $k_i$, where i is an integer index;
randomly select $m_1$ -$m_2$ values $k_i$, for the indices $m_2 \leq i \leq m_1$;
select $m_1$ mask values $\delta_i$;
compute $m_1$ residues $c_i$ based upon random residues $a_i$, $\delta_{\pi(i)}^{-1}$, and $k_{\pi(i)}$, wherein $\pi(i)$ is a random permutation;
compute $m_1$ elliptic curve points $G_i$ based upon random residues $a_i$ and an elliptic point to be multiplied;
and
the unsecure processor in communication with the memory device, wherein the unsecure processor receives the computationally intensive computations for the elliptic curve scalar multiplication to boost the system's computation performance, the unsecure processor being configured to:
receive, from the secure processor, the $m_1$ residues $c_i$ and elliptic curve points $G_i$;
compute $m_1$ elliptic curve points $P_i$ based upon the $m_1$ residues $c_i$ and elliptic curve points $G_i$; and
send the $m_1$ elliptic curve points $P_i$ to the secure processor, wherein the secure processor, receives the $m_1$, elliptic curve points and computes the elliptic curve scalar multiplication by combining a portion of the received elliptic curve points and by removing the mask values $\delta_i$ from the portion of the received elliptic curve points.

2. The system of claim 1, wherein the secure processor is further configured to:
randomly select $m_1$ residues $a_i$; and
store the $m_1$ residues $a_i$ in the secure memory.

3. The system of claim 1, wherein the $m_1$ mask values $\delta_i$ are selected from set of pre-computed random values stored in the secure memory.

4. The system of claim 1, wherein computing $m_1$ elliptic curve points $G_i$ based upon random residues $a_i$ and an elliptic point to be multiplied is computed as:

$$G_i = (a_i^{-1} \bmod n) \cdot G,$$

for $1 \le i \le m_1$, where G is elliptic point of the elliptic curve to be multiplied and n is the multiplicative order of the elliptic point G.

5. The system of claim 1, wherein splitting a secure scalar K into $m_2$ random values $k_i$ includes selecting $m_2-1$ random values $k_i$, for $1 \le i < m_2-1$, and computing $k_{m_2} = k - (\Sigma_{i=1}^{m_2-1} k_i) \bmod n$, where n is the multiplicative order of the elliptic point.

6. The system of claim 1, wherein computing $m_1$ residues $c_i$ is computed as:

$$c_i = a_i \cdot \delta_{\pi(i)}^{-1} \cdot k_{\pi(i)} \bmod n,$$

where n is the multiplicative order of the elliptic point.

7. The system of claim 1, wherein computing $m_1$ elliptic curve points $P_i$ is computed as:

$$P_i = c_i \cdot G_i.$$

8. The system of claim 1, wherein computing the elliptic curve scalar multiplication by combining a portion of the received elliptic curve points and removing the mask values $\delta_i$ from the portion of the received elliptic curve points is computed as:

$$k \cdot G = \Sigma_{i=1}^{m_2} \delta_i \cdot P_{\pi^{-1}(i)},$$

where G is elliptic point of the elliptic curve to be multiplied.

9. A method for securely performing elliptic curve scalar multiplication, using a secure processor separate from a unsecure processor, comprising:
by the secure processor:
splitting a secure scalar K into $m_2$ random values $k_i$, where i is an integer index;
randomly selecting $m_1 - m_2$ values $k_i$, for the indices $m_2 < i \le m_1$;
selecting $m_1$ mask values $\delta_i$;
computing $m_1$ residues $c_i$ based upon random residues $a_i$, $\delta_{\pi(i)}^{-1}$, and $k_{\pi(i)}$, wherein $\pi(i)$ is a random permutation;
computing $m_1$ elliptic curve points $G_i$ based upon random residues $a_i$ and an elliptic point to be multiplied;
and
by the unsecure processor;
receiving, from the secure processor, the $m_1$ residues $c_i$ and elliptic curve points $G_i$;
computing $m_1$ elliptic curve points $P_i$ based upon the $m_1$ residues $c_i$ and elliptic curve points $G_i$; and
sending the $m_1$ elliptic curve points $P_i$ to the secure processor, wherein the unsecure processor performs the computationally intensive computations for the elliptic curve scalar multiplication to boost the system's computation performance and wherein the secure processor, receives the $m_1$ elliptic curve points and computes the elliptic curve scalar multiplication by combining a portion of the received elliptic curve points and by removing the mask values $\delta_i$ from the portion of the received elliptic curve points.

10. The system of claim 1, wherein the secure processor further:
randomly selects $m_1$ residues $a_i$; and
stores the $m_1$ residues $a_i$ in a secure memory.

11. The method of claim 9, wherein the $m_1$ mask values $\delta_i$ are selected from set of pre-computed random values stored in a secure memory.

12. The method of claim 9, wherein computing $m_1$ elliptic curve points $G_i$ based upon random residues $a_i$ and an elliptic point to be multiplied is computed as:

$$G_i = (a_i^{-1} \bmod n) \cdot G,$$

for $1 \le i \le m_1$, where G is elliptic point of the elliptic curve to be multiplied and n is the multiplicative order of the elliptic point G.

13. The method of claim 9, wherein splitting a secure scalar K into $m_2$ random values $k_i$ includes selecting $m_2-1$ random values $k_i$, for $1 \le i < m_2-1$, and computing $k_{m_2} = k - (\Sigma_{i=1}^{m_2-1} k_i) \bmod n$, where n is the multiplicative order of the elliptic point.

14. The method of claim 9, wherein computing $m_1$ residues $c_I$ is computed as:

$$c_i = a_i \cdot \delta_{\pi(i)}^{-1} \cdot k_{\pi(i)} \bmod n,$$

where n is the multiplicative order of the elliptic point.

15. The method of claim 9, wherein computing $m_1$ elliptic curve points $P_i$ is computed as:

$$P_i = c_i \cdot G_i.$$

16. The method of claim 9, wherein computing the elliptic curve scalar multiplication by combining a portion of the received elliptic curve points and removing the mask values $\delta_i$ from the portion of the received elliptic curve points is computed as:

$$k \cdot G = \Sigma_{i=1}^{m_2} \delta_i \cdot P_{\pi^{-1}(i)},$$

where G is elliptic point of the elliptic curve to be multiplied.

17. A non-transitory machine-readable storage medium encoded with instructions for securely performing elliptic curve scalar multiplication using, an unsecure processor and an secure processor separate from the unsecure processor comprising:
instructions for execution by the secure processor including:
instructions for splitting a secure scalar K into $m_2$ random values $k_i$, where i is an integer index;
instructions for randomly selecting $m_1 - m_2$ values $k_i$, for the indices $m_2 < i \le m_1$;
instructions for selecting $m_1$ mask values $\delta_i$;
instructions for computing $m_1$ residues $c_i$ based upon random residues $a_i$, $\delta_{\pi(i)}^{-1}$, and $k_{\pi(i)}$, wherein $\pi(i)$, wherein $\pi(i)$ is a random permutation;
instructions for computing $m_1$ elliptic curve points $G_i$ based upon random residues $a_i$ and an elliptic point to be multiplied;
instructions for execution by the unsecure processor for performing the computationally intensive computations for the elliptic curve scalar multiplication to boost the system's computation performance by including:

instructions for receiving, from the secure processor, the $m_1$ residues $c_i$ and elliptic curve points $G_i$;

instructions for computing $m_1$ elliptic curve points $P_i$ based upon the $m_1$ residues $c_i$ and elliptic curve points $G_i$; and instructions for sending the $m_1$ elliptic curve points $P_i$ to the secure processor wherein the instructions for the secure processor enable the secure processor to receive the $m_1$, elliptic curve points and compute the elliptic curve scalar multiplication by combining a portion of the received elliptic curve points and by removing the mask values $\delta_i$ from the portion of the received elliptic curve points.

18. The non-transitory machine-readable storage medium of claim 17, wherein the instructions for execution by the secure processor further include:

instructions for randomly selecting $m_1$ residues $a_i$; and instructions for storing the $m_1$ residues $a_i$ in a secure memory.

19. The non-transitory machine-readable storage medium of claim 17, wherein the $m_1$ mask values $\delta_i$ are selected from set of pre-computed random values stored in a secure memory.

20. The non-transitory machine-readable storage medium of claim 17, wherein computing $m_1$ elliptic curve points $G_i$ based upon random residues $a_i$ and an elliptic point to be multiplied is computed as:

$$G_i=(a_i^{-1} \bmod n) \cdot G,$$

for $1 \leq i \leq m_1$, where G is elliptic point of the elliptic curve to be multiplied and n is the multiplicative order of the elliptic point G.

21. The non-transitory machine-readable storage medium of claim 17, wherein splitting a secure scalar K into $m_2$ random values $k_i$ includes selecting $m_2-1$ random values $k_i$, for $1 \leq i < m_2-1$, and computing $k_{m_2}=k-(\Sigma_{i=1}^{m_2-1}k_i) \bmod n$, where n is the multiplicative order of the elliptic point.

22. The non-transitory machine-readable storage medium of claim 17, wherein computing $m_1$ residues $c_I$ is computed as:

$$c_i=a_i \cdot \delta_{\pi(i)}^{-1} \cdot k_{\pi(i)} \bmod n,$$

where n is the multiplicative order of the elliptic point.

23. The non-transitory machine-readable storage medium of claim 17, wherein computing $m_1$ elliptic curve points $P_i$ is computed as:

$$P_i=c_i \cdot G_i.$$

24. The non-transitory machine-readable storage medium of claim 17, wherein computing the elliptic curve scalar multiplication by combining a portion of the received elliptic curve points and removing the mask values $\delta_i$ from the portion of the received elliptic curve points is computed as:

$$k \cdot G=\Sigma_{i=1}^{m_2}\delta_i \cdot P_{\pi^{-1}(i)},$$

where G is elliptic point of the elliptic curve to be multiplied.

* * * * *